United States Patent [19]
Hitotsumachi

[11] Patent Number: 5,442,451
[45] Date of Patent: Aug. 15, 1995

[54] HELICAL SCAN RECORDING/REPRODUCING DEVICE FOR SIMULTANEOUSLY HELICALLY RECORDING/REPRODUCING BOTH VIDEO AND AUDIO SIGNALS

[75] Inventor: Shuzo Hitotsumachi, Yawata, Japan

[73] Assignees: Matsushita Electric Industrial Co., Ltd., Osaka; Hitachi, Ltd., Tokyo, both of Japan

[21] Appl. No.: 32,973

[22] Filed: Apr. 2, 1987

Related U.S. Application Data

[63] Continuation of Ser. No. 807,111, Dec. 10, 1985, abandoned, which is a continuation of Ser. No. 467,226, Feb. 17, 1983, abandoned.

[30] Foreign Application Priority Data

| Feb. 22, 1982 | [JP] | Japan | 57-27212 |
| May 13, 1982 | [JP] | Japan | 57-80886 |
| May 14, 1982 | [JP] | Japan | 57-81938 |
| May 14, 1982 | [JP] | Japan | 57-81939 |
| Aug. 20, 1982 | [JP] | Japan | 57-145040 |
| Aug. 27, 1982 | [JP] | Japan | 57-149681 |

[51] Int. Cl.⁶ ............................................. H04N 9/80
[52] U.S. Cl. ............................... 358/330; 358/310; 358/343; 358/328; 360/19.1; 360/20; 360/21; 360/33.1; 360/30
[58] Field of Search .......... 358/310, 328, 330, 335, 358/311, 343; 360/19.1, 20, 21, 103, 23, 33.1, 66

[56] References Cited

U.S. PATENT DOCUMENTS

| 3,278,678 | 10/1966 | Rank | 360/18 X |
| 3,893,163 | 7/1975 | Wessels et al. | 358/330 |
| 3,925,816 | 12/1975 | Kihara | 360/6 X |
| 4,180,833 | 12/1979 | Nishikawa et al. | |
| 4,197,562 | 4/1980 | Kikuya et al. | 360/64 X |
| 4,199,793 | 4/1980 | Baldwin | 360/84 X |
| 4,293,880 | 10/1981 | Tsukada et al. | 360/64 X |
| 4,296,430 | 10/1981 | Warren | 358/328 |
| 4,325,088 | 4/1982 | Wright | 360/66 X |
| 4,328,518 | 5/1982 | Kwata et al. | 360/64 X |
| 4,352,130 | 9/1982 | Hasegawa et al. | 360/66 |
| 4,392,161 | 7/1983 | Ota et al. | 360/10.3 |
| 4,426,666 | 1/1984 | Kobayashi et al. | |
| 4,453,186 | 6/1984 | Watatani et al. | 385/343 X |
| 4,490,753 | 12/1984 | Ito et al. | 360/19.1 |
| 4,520,405 | 5/1985 | Sasaki et al. | 360/10.3 |
| 4,607,293 | 8/1986 | Okada et al. | 358/328 |

FOREIGN PATENT DOCUMENTS

| 55-77012 | 10/1980 | Japan | 360/19.1 |
| 2027252 | 2/1980 | United Kingdom | 360/33.1 |

OTHER PUBLICATIONS

IBM Technical Disclosure Bulletin, vol. 11, No. 7, Dec. 1968, p. 793, New York, US; W. T. Frost et al.: "Video recorder with multiplex audio" (p. 793).
Patent Abstracts of Japan, vol. 2, No. 143, Nov. 25, 1978, p. 9012 E 78; & JP -A-53 110 811 (Matsushita Denki Sangyo K.K.) Sep. 28, 1978 (Abstract).
Patents Abstracts of Japan, vol. 4, No. 100 (P-19) [582], Jul. 8, 1980; & JP -A -55 58 807 (Pioneer K.K.) Jan. 5, 1980 (Abstract).
Patents Abstracts of Japan, vol. 5, No. 103 (E-64) [775], Jul. 3, 1981; & JP -A -56 44 285 (Matsushita Denki Sangyo K.K.) Apr. 23, 1981 (Abstract).

*Primary Examiner*—Tommy P. Chin
*Assistant Examiner*—Khoi Truong
*Attorney, Agent, or Firm*—Wenderoth, Lind & Ponack

[57] ABSTRACT

A video tape recorder includes a cylinder provided to rotate about its axis. A magnetic tape moves along a portion of the cylinder surface such that the cylinder surface obliquely traverses the magnetic tape. At least one pair of magnetic heads are mounted on the cylinder surface for recording and reproducing video signal on the tape, and another pair of magnetic heads are mounted on the cylinder for recording and reproducing audio signal on the tape.

20 Claims, 3 Drawing Sheets

HELICAL SCAN RECORDING/REPRODUCING DEVICE FOR SIMULTANEOUSLY HELICALLY RECORDING/REPRODUCING BOTH VIDEO AND AUDIO SIGNALS

This application is a continuation of now abandoned application Ser. No. 807,111, filed Dec. 10, 1985, which is, in turn, a continuation of now abandoned application Ser. No. 467,226, filed Feb. 17, 1983.

BACKGROUND OF THE INVENTION

The present invention relates to a magnetic recording and/or reproducing device and, more particularly, to a video tape recorder with an outstanding feature in recording an audio signal that accompanies a video signal.

DESCRIPTION OF THE PRIOR ART

A magnetic recording and/or reproducing device of a helical scan type, referred to as a video tape recorder, generally includes a rotatable cylinder having at least one video magnetic mounted thereon. A magnetic tape is wound spirally around the cylinder for a predetermined angles. As the magnetic tape advances during the rotation of the cylinder, the video magnetic head sequentially records or reproduces video signals as it scans diagonally across the magnetic tape.

According to the prior art video tape recorder, an audio signal is successively recorded on, or reproduced from, a recording track extending lengthwisely of a magnetic tape by an audio magnetic head, which is provided stationarily at a position along a path of the magnetic tape and externally of the cylinder. However, because of the recent developments in the technology of high density recording, the tape running speed for recording or reproducing is reduced and, therefore, the relative velocity between the stationary audio magnetic head and the magnetic tape is lowered. As a result, characteristics the frequency characteristic of the reproduced audio signal tend to be unsatisfactory.

SUMMARY OF THE INVENTION

The present invention has been developed with a view to substantially solving the above described disadvantage and has for its essential object to provide an improved video tape recorder that can offer excellent frequency characteristics for the recorded and reproduced audio signal.

It is also an essential object of the present invention to provide a video tape recorder of the above described type which can carry out a high density recording as well as a standard density recording.

In accomplishing these and other objects, a video tape recorder, according to the present invention, is characterized in that the audio magnetic head for recording and/or reproducing the audio signal is provided in the cylinder together with the video magnetic head for recording and/or reproducing the video signal, so as to obtain a high relative velocity between the audio magnetic head and the magnetic tape, even when the tape running speed is slow.

According to the present invention, a video tape recorder comprises a cylinder which rotates about its axis, a means for moving an elongated recording medium along a portion of the cylinder surface such that the cylinder surface obliquely traverses the medium, a first magnetic head means mounted on the cylinder surface for recording and reproducing video signals on the medium, and a second magnetic head means mounted on the cylinder for recording and reproducing audio signals on the medium.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Figure 1:
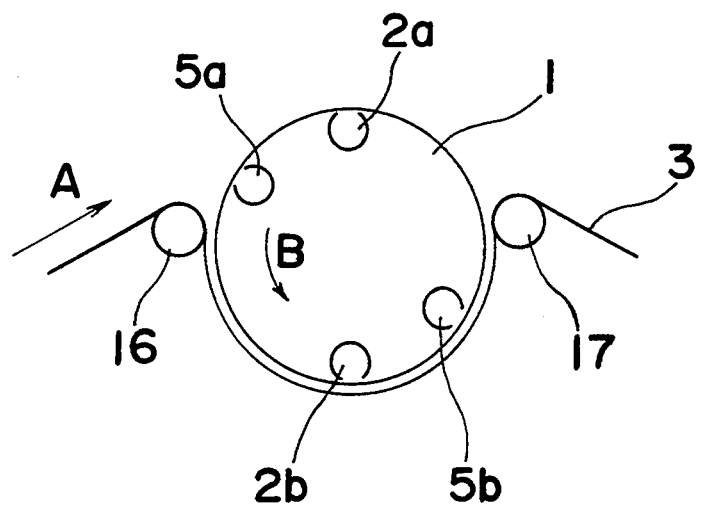
FIG. 1 is a diagrammatic view showing an arrangement of video and audio magnetic heads on a cylinder, according to a first embodiment of the present invention.

Referring to FIG. 1, a video tape recorder according to a first embodiment of the present invention comprises a cylinder 1 rotatably mounted on a casing (not shown) and driven by a motor (not shown). Mounted in the cylinder 1 are video heads 2a and 2b and audio heads 5a and 5b, in which the angle of inclination of their head gaps (azimuth) is different from each other. The video heads 2a and 2b are spaced at a 180° angular relationship with respect to each other and, the audio heads 5a and 5b are also spaced at a 180° angular relationship with respect to each other. Furthermore, the audio heads 5a and 5b are spaced at a 60° angular relationship from the video heads 2a and 2b, respectively. A pair of tape guides 16 and 17 are provided to move a magnetic tape 3 in a position for recording or playback. More specifically, the tape guides 16 and 17 are so moved as to wrap the magnetic tape 3 around the cylinder surface for an angle which is slightly greater than 180°, and, at the same time, winding the magnetic tape 3 spirally on the cylinder surface with a predetermined inclination with respect to the axis of the cylinder, in the same fashion as a prior art video tape recorder of the helical scan type.

In the position shown in FIG. 1, when the cylinder 1 rotates in a direction B and when the magnetic tape 3 advances in a direction A, the video heads 2a and 2b on the cylinder 1 diagonally scan the running magnetic tape 3 to record or reproduce the video signal on the magnetic tape.

It is to be noted that the magnetic tape 3 can be advanced either in a standard tape speed for the standard recording or in a slow tape speed for a high density, long term recording. The slow tape speed is 1/N times the standard speed, wherein N is an integer, preferably 3.

Figure 2:
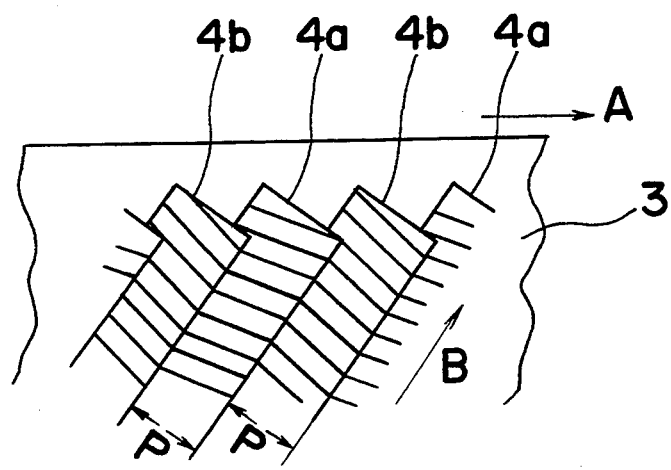
FIG. 2 is an schematic view showing a form of video signal recorded on a magnetic tape under a slow tape speed recording.

Referring to FIG. 2, tracks 4a and 4b, on which a video signal is recorded under the slow tape speed operation, are shown. The tracks 4a and 4b are formed on the magnetic tape 3 by the scan of the video heads 2a and 2b, respectively. As apparent from. FIG. 2, the tracks 4a and 4b occur alternately with a pitch P, and are partly overlapping each other. Since the head gap of the video head 2a has an azimuth of +6°, and the head gap of the video head 2b has an azimuth of −6°, the tracks 4a and 4b are magnetized, during the recording of the video signal, in directions which are inclined +6° and −6°, respectively, with respect to the direction perpendicular to the head scanning direction B.

Figure 3:
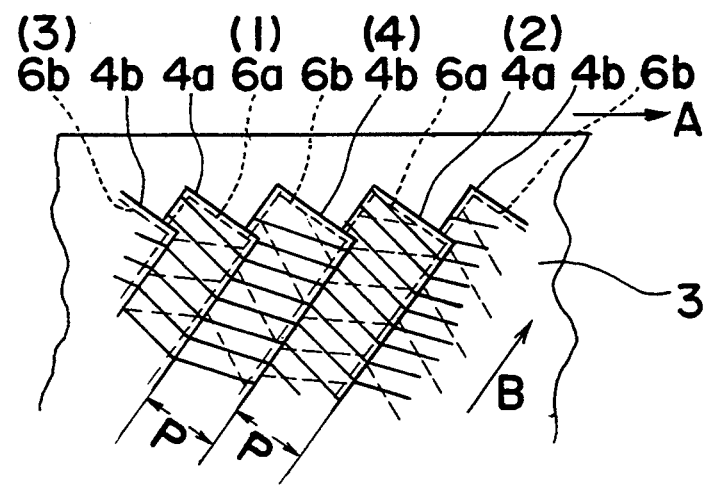
FIG. 3 is a schematic view showing a form of audio signal recorded on a magnetic tape under a slow tape speed recording such that the video signal and audio signal overlap each other.

In a similar manner to the above, the audio heads 5a and 5b scan diagonally on the running magnetic tape 3 during the recording or playback mode to record or reproduce the audio signal on the magnetic tape 3. The audio heads 5a and 5b are provided at a predetermined level on the cylinder surface, (for example, they are provided on the cylinder at a level which is 47 micrometers above the level where the video heads 2a and 2b are provided), and each audio head has a predetermined head width in consideration of the head width of video heads, (for example, when video heads 2a and 2b have a head width of 32 micrometers, the audio heads 5a and 5b have a head width of 30 micrometers). Accordingly, in the slow tape speed operation, the audio heads 5a and 5b scan over tracks 6a and 6b which occupy almost the same area as that of the tracks 4a and 4b, respectively, as shown in FIG. 3, in which the tracks 6a and 6b are shown by broken lines. More particularly, the audio head 5a scans along a line diagonally across the magnetic tape 3 to form a track 6a for recording frequency modulated audio signal and, then, at different moment, the video head 2a scans along the same line to form a track 4a for recording video signal. In FIG. 3, numbers given in parentheses above the reference character show the order of tracking.

Figure 5:
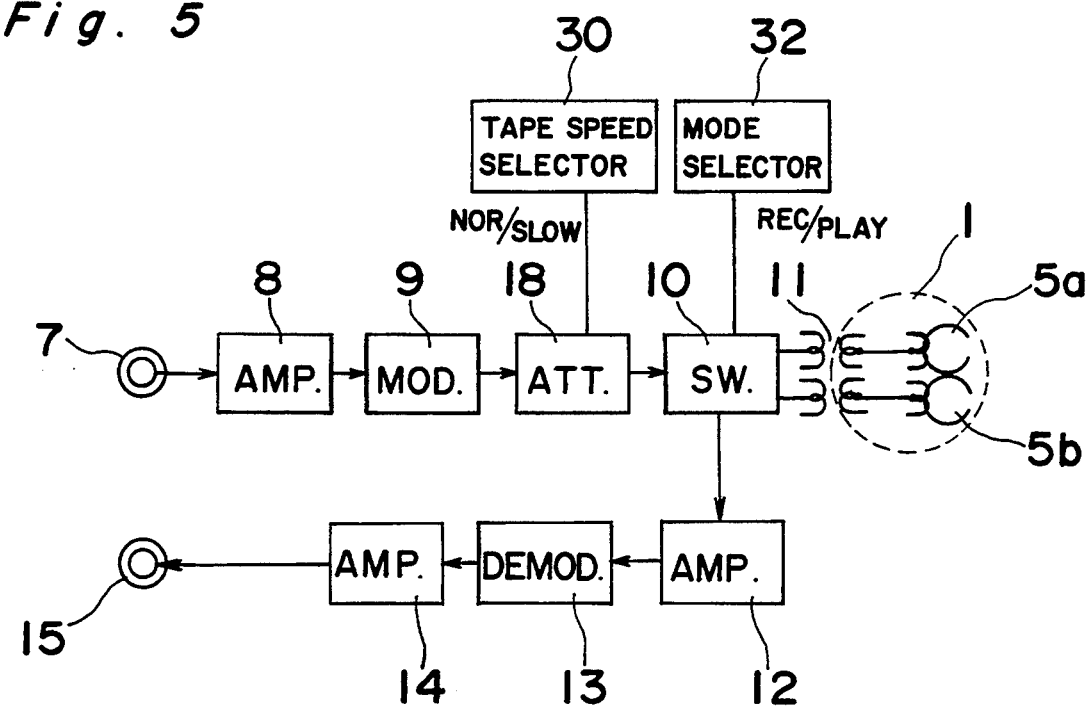
FIG. 5 is a block diagram of an audio circuit for use in a video tape recorder according to the present invention.

Referring to FIG. 5, the description is now directed to a circuit for recording and playback of the audio signal. The video tape recorder according to the present invention includes an amplifier 8 connected to an input terminal 7, a modulator 9 for effecting a frequency modulation by a carrier wave having a frequency of 1.3 MHz, an attenuator 18 connected to the modulator 9 and coupled with a tape speed selector 30, a switching circuit 10 connected to the attenuator 18 and coupled with a mode selector 32, and a rotary transformer 11 connected to the switching circuit 10. A part of the rotary transformer 11 is provided in the cylinder 1 and is connected to audio heads 5a and 5b. The video tape recorder further includes an amplifier 12 connected to the switching circuit 10, a demodulator 13 connected to the amplifier 12, and an amplifier 14 connected to the demodulator 13; the amplifier 14 is in turn connected to an output terminal 15.

The tape speed selector 30 controls the attenuator 18 such that when a standard tape speed is selected, the degree of attenuation effected by the attenuator 18 is increased by about 10 dB when compared with the degree of attenuation in the slow tape speed ($\frac{1}{3}$ of the standard tape speed). The reason for this will be described later.

The mode selector 32 controls the switching circuit 10 such that when the recording mode is selected, the switching circuit 10 connects the attenuator 18 to the transformer 11 and disconnects the amplifier 12 from the transformer 11, and at the same time, the switching circuit 10 supplies the audio signal modulated on the carrier alternately to the audio heads 5a and 5b in a synchronized relationship with respect to the rotation of the cylinder 1, and when the playback mode is selected, the switching circuit 10 connects the amplifier 12 to the transformer 11 and disconnects the attenuator 18 from the transformer 11, and at the same time, the switching circuit 10 receives the reproduced audio signal modulated on the carrier alternately from the audio heads 5a and 5b.

Thus, in the recording mode under a slow tape speed operation, the audio signal supplies to an input terminal 7 is amplified by an amplifier 8 and, then, it is frequency-modulated in a modulator 9 with the carrier wave having a frequency 1.3 MHz. The frequency modulated audio signal, i.e., the audio signal modulated on the carrier is then supplied through attenuator 18, switching circuit 10 and transformer 11 to audio heads 5a and 5b for effecting the recording of audio signal on carrier on the tracks 6a and 6b in a manner shown in FIG. 3.

Figure 4:
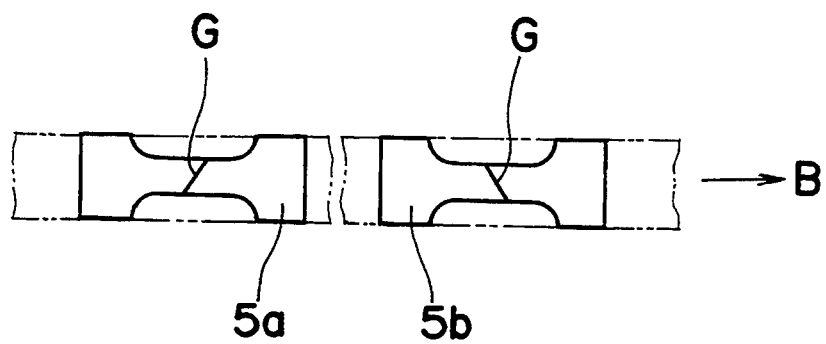
FIG. 4 is a fragmentary view of a pair of audio magnetic heads provided in the cylinder, according to the present invention.

Each of the audio heads 5a and 5b, as shown in FIG. 4, has a head gap G inclined in several tens of degrees (such as 30°) from a line perpendicular to the head scanning direction B. Furthermore, the direction of inclination of the head gap G in the audio head 5a is opposite to that in the audio head 5b and, therefore, the tracks 6a and 6b are magnetized, during the recording of the audio signal, in directions which are inclined, e.g., −30° and +30° respectively, with respect to the direction perpendicular to the head scanning direction. Since the tracks 4a and 4b, which occupy the same area as the tracks 6a and 6b, respectively, are magnetized with inclinations of +6° and −6°, as mentioned above, the direction of magnetization on the track 4a is inclined 36° with respect to the direction of magnetization on the track 6a. The same can be said to the magnetization on the tracks 4b and 6b. Such an inclination between the directions of magnetization on the tracks 4a and 6a, or 4b and 6b, reduces the undesirable interference between signals on the tracks 4a and 6a, or 4b and 6b.

In consideration of a fact that the audio signal modulated on carrier recorded in the tracks 6a and 6b is eventually attenuated by about 10 dB when video signal is further recorded on the tracks 4a and 4b overlapping the tracks 6a and 6b, the carrier current supplied to the audio heads 5a and 5b during the recording mode is controlled so as to render the carrier-to-noise ratio of the carrier of the audio signal to be 20 dB during the playback.

In the playback mode under a slow tape speed operation, the recorded audio signal modulated on the carrier is reproduced alternately by the audio heads 5a and 5b, and is supplied through the rotary transformer 11 and switching circuit 10 to the amplifier 12, wherein it is amplified to a predetermined level. Then, the amplified audio signal on carrier is supplied to the demodulator 13 which produces a demodulated audio signal. The demodulated audio signal is amplified by the amplifier 14, and is produced from the output terminal 15.

Figure 6:
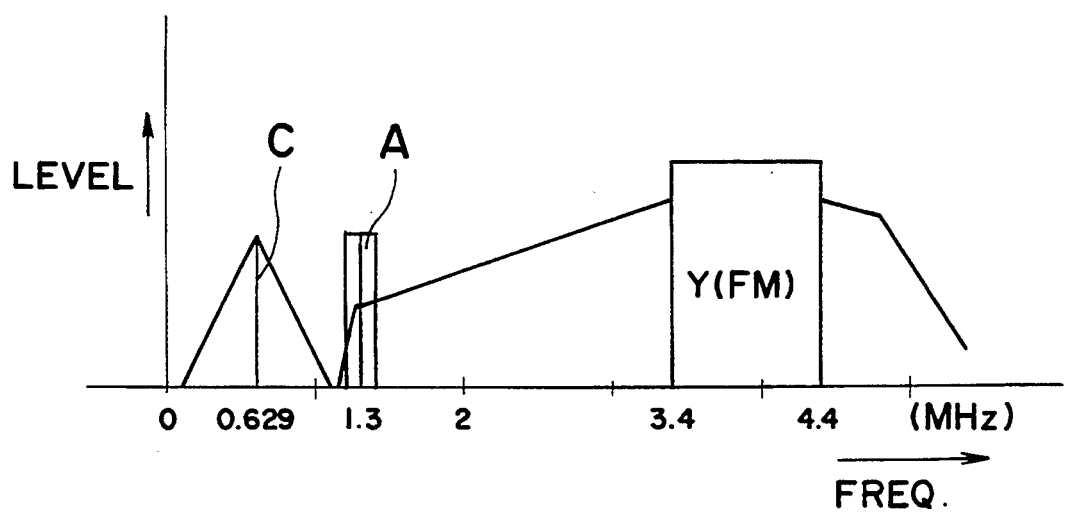
FIG. 6 is a graph showing frequency band distribution of various signals recorded in the magnetic tape.

During the playback mode under a slow tape speed operation, although the audio heads 5a and 5b also scan along tracks 4a and 4b where the video signal is recorded, the audio heads 5a and 5b will not pick up any video signal because of the following reasons. The first reason is that the video signal sensed by the audio heads is attenuated by the azimuth loss. The second reason is that the carrier for the audio signal has a frequency of about 1.3 MHz, as shown in FIG. 6, which frequency is offset from the frequency band of video signal, such as low frequency conversion color signal C having a frequency band of, e.g., 629 KHz±500 KHz, and frequency modulated luminance signal Y(FM) having a frequency band between 3.4 MHz and 4.4 MHz. Although the frequency band of the carrier for the audio signal falls in a high frequency component region of the luminance signal of a low side-band of the frequency modulated luminance signal Y(FM), the amplitude of the low side-band in this region is rather low and, therefore, the video signal scarcely affects the audio signal.

Similarly, during the playback mode under a slow tape speed operation, although the video heads 2a and 2b also scan along tracks 6a and 6b where the audio signal is recorded, the video heads 2a and 2b will not pick up any audio signal because of the azimuth loss of the audio signal, and of the attenuation of the audio signal effected when the video signal is recorded over the audio signal.

Figure 7:
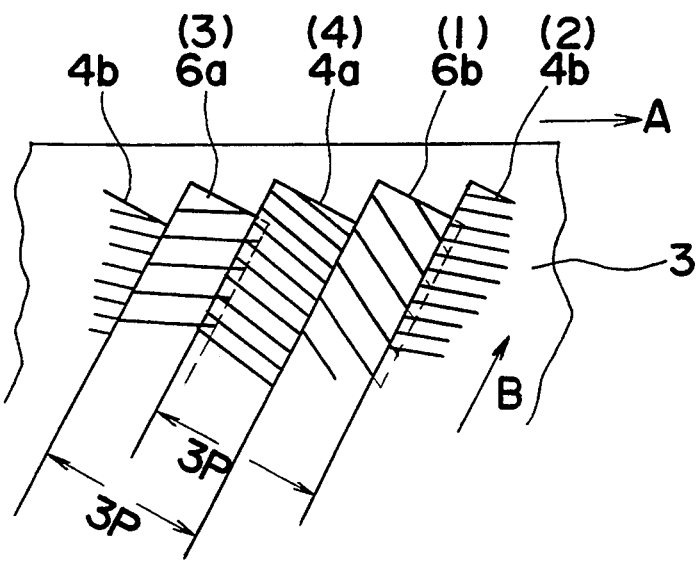
FIG. 7 is a schematic view showing a form of video and audio signals recorded on a magnetic tape by the arrangement of FIG. 1 under a standard tape speed recording.

Next, the operation of standard tape speed recording mode is described. In the standard tape speed operation, the tape speed is an integral multiple of the slow tape speed operation (e.g.—3 times the speed) and, therefore, the tracks 4a, 4b, 6a and 6b formed on the magnetic tape 3 are different from that obtained under the slow tape speed operation. More specifically, as shown in FIG. 7, the video heads 2a and 2b scan to form tracks 4a and 4b, respectively, and the audio heads 5a and 5b scan to form tracks 6a and 6b, respectively, with slight overlaps between tracks 4a and 6a and between 4b and 6b. The video and audio tracks in a pair are repeated with a pitch of 3 P, and are formed in the order indicated by a number in parentheses above the reference character.

Since most parts of the tracks are not overlapping each other, the audio signal modulated on the carrier recorded in such parts will not be attenuated by the video signal. Therefore, if the carrier current supplied to the audio heads 5a and 5b under the standard tape speed recording is at the same level as that in the slow tape speed recording, the recorded level increases by around 10 dB or more. This results in an undesirable cross-talk during the playback such that, if the video head 2a or 2b deviates from the track 4a or 4b during tracking, the video head 2a or 2b scans over audio tracks 6a or 6b carrying a high level signal, resulting in an interference of the video signal by the audio signal.

In order to eliminate the above noted disadvantage, the tape speed-selector 30 reduces the degree of attenuation in the attenuator 18 by about 10 dB in the standard tape speed recording mode when compared with that in the slow tape speed recording mode. In this manner, since the carrier current supplied to the audio heads 5a and 5b is reduced in the standard tape speed recording mode, the audio signal on carrier reproduced in the standard tape speed playback mode is about the same as that reproduced in the slow tape speed playback mode.

Furthermore, by the above arrangement, although the video head 2a or 2b may pick up the audio signal in the standard or slow tape speed recording mode, the level of the sensed audio signal by the video head 2a or 2b is very low and, therefore, there will be no interference between the audio signal and video signal.

Moreover, since the audio signal on carrier as recorded on the tracks 6a and 6b is a frequency modulated signal, the reproduced audio signal has a high quality regardless of its recording level. For example, the reproduced audio signal has S/N ratio above 55 dB and a frequency characteristic between 20 Hz and 20 KHz, with wow and flutter being less than 0.005%. These figures indicate a great improvement of the video tape recorder of the present invention.

Figure 8:
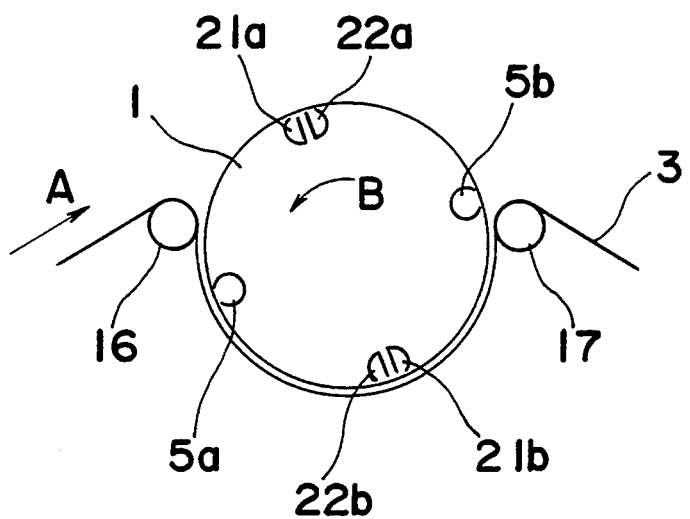
FIG. 8 is a diagrammatic view showing an arrangement of video and audio magnetic heads on a cylinder, according to a second embodiment of the present invention.

Referring to FIG. 8, a video tape recorder according to a second embodiment of the present invention is shown, which comprises a pair of video heads 21a and 21b located at opposite ends of a first cylinder diameter for use in recording and reproducing video signals under slow tape speed operation, and another pair of video heads 22a and 22b located at opposite ends of a second cylinder diameter, which is closely adjacent to the first cylinder diameter, for use in recording and reproducing video signals under standard tape speed operation. Each of the video heads 21a and 21b has a head width of 32 micrometers, which is the same as that of the video heads 2a and 2b in the first embodiment, and each of the video heads 22a and 22b has a head width of 70 micrometers. The audio heads 5a and 5b have a 30 micrometer head width as in the previous embodiment, and are located at opposite ends of a third cylinder diameter which is perpendicular to the first cylinder diameter.

The video heads 21a and 22b have the same azimuth, e.g., +6°, and the video heads 21b and 22a have the same azimuth, e.g., −6°.

As is apparent from FIG. 8, the video heads 21a and 22a are positioned closely adjacent to each other, and so are the video heads 21b and 22b. Furthermore, all the video heads 21a, 21b, 22a and 22b are mounted at the same level of the cylinder, whereas the audio heads 5a and 5b are mounted at a level, for example, 10 micrometers above the level of video heads.

The video tape recorder according to the second embodiment operates as follows.

In the slow tape speed recording mode, the video signal is recorded on the magnetic tape 3 along the tracks 4a and 4b (FIG. 3) by the video heads 21a and 21b, and the audio signal is recorded along the tracks 6a and 6b (FIG. 3) by the audio heads 5a and 5b. Thus, the form of recorded tracks in this mode of operation is the same as that in the first embodiment. Notwithstanding the difference in position of the audio heads 5a and 5b in comparison to the first embodiment, this similarity in the recording form is accomplished by adjusting the level of the audio heads 5a and 5b on the cylinder 1. The operation in the slow tape speed playback mode is carried out in the same manner as that in the first embodiment. Therefore, a video tape, which has been recorded by the video tape recorder of the second embodiment under a slow tape speed, can be played in the video tape recorder of the first embodiment, or vice versa.

Figure 9:
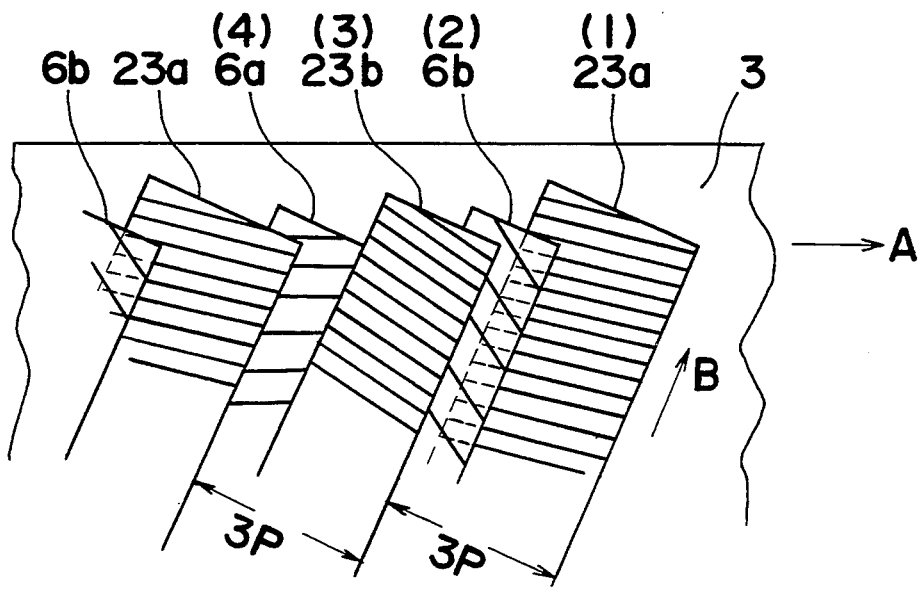
FIG. 9 is a schematic view showing a form of video and audio signals recorded on a magnetic tape by the arrangement of the FIG. 8 under a standard tape speed recording.

In the standard tape speed recording mode, the video heads 22a and 22b having a wide head width are used and therefore, the form of recorded tracks on the magnetic tape 3 is different from that in the first embodiment. More particularly, as shown in FIG. 9, the video heads 22a and 22b scan to form tracks 23a and 23b, respectively, while the audio heads 5a and 5b scan to form tracks 6a and 6b, respectively. A number given in parentheses above the reference character shows the order of tracking.

In the standard tape speed operation, the tape speed selector 30 reduces the degree of attenuation in the attenuator 18 by about 10 dB in the standard tape speed recording mode when compared to that used in the slow tape speed recording mode, so as to eliminate the undesirable cross-talk between the audio and video tracks, as stated in the first embodiment.

Although the pattern of tracks shown in FIG. 9 appears to be different from that shown in FIG. 7, both patterns have a zone of video tracks and a zone of audio tracks occurring alternately with a pitch of 1½ P. Thus, a video tape, which has been recorded by the video tape recorder of the second embodiment under a standard tape speed, can be played in the video tape recorder of the first embodiment, or vice versa. In other words, according to the present invention, the video heads and audio heads are so located that the video tracks and audio tracks overlap each other completely or almost completely during the slow tape speed recording mode and the video tracks and audio tracks, although they may overlap each other, occur alternately during the standard tape speed recording mode. Accordingly, the video tape recorders of the first and second embodiments are compatible.

As has been described above, the video tape recorder of the present invention has at least one audio head mounted in a cylinder for recording and reproducing an audio signal modulated on a carrier. Therefore, the wow a flutter of the reproduced audio signal can be reduced to 1/10th of that of the prior art video tape recorder and, at the same time, the signal-to-noise ratio and frequency characteristics can be improved greatly, thus improving the quality of the reproduced sound.

It is to be noted that by employing an additional audio head in the path of the tape externally of the cylinder, the video tape recorder according to the present invention can play a tape which has been recorded by the prior art video tape recorder, or vice versa.

Furthermore, according to the present invention, the audio signal modulated on the carrier can be recorded on the magnetic tape in an overlapping manner with the video signal without causing any undesirable interference therebetween. Thus, high density recording can be accomplished without any problem, Although the present invention has been fully described with reference to several preferred embodiments many modifications and variations thereof will now be apparent to those skilled in the art, and the scope of the present invention is therefore to be limited not by the details of the preferred embodiments described above, but only by the terms of appended claims.

What is claimed is:

1. A magnetic recording and reproduction system in which a frequency-modulated luminance signal, a chrominance signal placed in a frequency band below a frequency band of said luminance signal, and a frequency-modulated audio signal placed in the frequency band of said luminance signal are recorded on a video track of a magnetic tape with a low speed such that adjacent video tracks contact each other and, thereafter, the recorded signals are reproduced from said tape, said system comprising:

first and second video heads for recording and reproducing said luminaries signal and laid chrominance signal, said heads having gaps with azimuth angles in opposite inclination directions;

first and second audio heads for recording and reproducing said audio signal, said heads having gaps with azimuth angles in opposite inclination directions, and in different values of azimuth angle from those of said video heads;

a rotary member which mounts said video heads and said audio heads, and causes said video and audio heads to trace said video track of said magnetic tape;

means for operating on said first audio head and said first video head to trace a first video track;

means for operating on said second audio head and said second video head to trace a second video track.

2. A magnetic recording and reproduction system according to claim 1, wherein said first and second audio heads have azimuth angles larger than those of said first and second video heads.

3. A magnetic recording and reproduction system according to claim 1, wherein said first and second audio heads are mounted on said rotary member with a spacing of 180 degrees from each other, and said first and second video heads are mounted on said rotary member with a spacing of 180 degrees from each other, said first and second audio heads being offset from said first and second audio heads being offset from said first and second video heads.

4. A magnetic recording/reproducing device comprising:

a rotatable cylinder, rotated by a driving means;

a tape loading means for loading a magnetic tape such that a portion of said magnetic tape is helically wound on said rotatable cylinder for a predetermined angle;

a tape moving means for moving said tape at a first predetermined speed;

first and second video heads mounted on said rotatable cylinder for recording/reproducing video signal on said magnetic tape, said first and second video heads having a first predetermined angle of azimuth inclined in opposite directions; and first and second audio head mounted on said rotatable cylinder for recording/reproducing audio signal on said magnetic tape, said first and second audio heads having a second predetermined angle of azimuth inclined in opposite directions;

wherein said tape moving means moves said tape at said first predetermined speed so that said first and second audio heads obliquely traverse said tape to provide, respectively, first and second audio tracks overlapping with each other at their sides, and that said first and second video heads obliquely traverse said tape to provide, respectively, first and second video tracks which are overlapping with each other at their sides, and at the same time, are overlapping, respectively, completely with said first and second audio tracks;

said device further comprising a frequency modulator for modulating a carrier by said audio signal, said carrier having a frequency which falls in a low side-band of a frequency modulated luminance signal portion of said video signal and adjacent to a low frequency conversion color signal portion of said video signal;

wherein said first and second video heads oppositely inclined azimuths of ±6 degrees, respectively and said first and second audio heads have oppositely inclined azimuths of ±30 degrees, respectively.

5. A device as claimed in claim 4, wherein said carrier frequency is approximately 1.3 MHz and wherein the head width of the audio heads is smaller than that of the video heads.

6. A device as claimed in claim 4, wherein said tape moving means is capable of moving said tape either at said first predetermined speed or a second predetermined speed which is faster than said first predetermined speed, and further comprising a selecting means for selecting either one of said first and second predetermined tape speed, wherein, when said second predetermined speed is selected, said tape moving means moves said tape at said second predetermined speed so that said first and second audio heads obliquely traverse said tape to provide, respectively, first and second audio tracks alternately with a predetermined spacing, and so that said first and second video heads obliquely traverse said tape to provide, respectively, first and second video tracks alternately in said spacing with a partial overlapping at their sides with said first and second audio tracks.

7. A device as claimed in claim 4, wherein said first and second audio heads are provided at opposite ends of a first diameter of said cylinder.

8. A device as claimed in claim 7, wherein said first and second video heads are provided at opposite ends of a second diameter of said cylinder.

9. A device as claimed in claim 8, wherein an angle between said first and second diameters is in the range of about 60° to 90°.

10. A device as claimed in claim 8, wherein said first and second diameters contain 60°.

11. A device as claimed in claim 4, wherein said first and second video heads are provided at a first level on the cylinder, and wherein said first and second audio heads are provided at a second level on the cylinder above a predetermined distance from said first level.

12. A device as claimed in claim 6, wherein said second predetermined speed is three times that of said first predetermined speed.

13. A device as claimed in claim 6, further comprising: a frequency modulator and carrier frequency generator for frequency modulating said audio signal and for producing a carrier modulated by said audio signal, and an attenuator for attenuating said carrier modulated by said audio signal to a predetermined level, and a switching circuit and a transformer for supplying said modulated carrier to said first and second audio heads.

14. A device as claimed in claim 13, wherein said carrier frequency generator generates said carrier so as to have a frequency which falls in a low side-band of a frequency modulated luminance signal portion of said video signal and adjacent to a low frequency conversion color signal portion of said video signal.

15. A device as claimed in claim 13, further comprising a switching means coupled to said attenuator for changing the degree of attenuation relative to the change of speed of said tape.

16. A device as claimed in claim 8, further comprising third and fourth video heads provided at opposite ends of a third diameter of said cylinder such that said first and third video heads are located closely adjacent to each other and said second and fourth video heads are located closely adjacent to each other, said first and second diameters being in a right angle relationship to each other.

17. A device as claimed in claim 16, wherein said first and fourth video heads have a head gap of the same azimuth, and said second and third video heads have a head gap of the same azimuth, but different from the first mentioned azimuth.

18. A device as claimed in claim 17, wherein said first, second, third and fourth video heads are provided at a first level on the cylinder, and wherein said first and second audio heads are provided at a second level on the cylinder above a predetermined distance from said first level.

19. A device as claimed in claim 18, further comprising: a frequency modulator and carrier frequency generator for frequency modulating said audio signal and producing a carrier modulated by said audio signal, and an attenuator for attenuating said carrier modulated by said audio signal to a predetermined level, and a switching circuit and a transformer for supplying said modulated carrier to said first and second audio heads.

20. A device as claimed in claim 19, wherein said carrier frequency generator generates said carrier so as to have a frequency which falls in a low side-band of a frequency modulated luminance signal portion of said videos signal and adjacent to a low frequency conversion color signal portion of said video signal.

* * * * *